United States Patent
Vijayasankar et al.

(10) Patent No.: US 9,264,103 B2
(45) Date of Patent: Feb. 16, 2016

(54) ASYMMETRIC CHANNELS IN POWER LINE COMMUNICATIONS

(71) Applicant: TEXAS INSTRUMENTS INCORPORATED, Dallas, TX (US)

(72) Inventors: Kamaran Vijayasankar, Dallas, TX (US); Ramanuja Vedantham, Allen, TX (US); Il Han Kim, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/010,267

(22) Filed: Aug. 26, 2013

(65) Prior Publication Data

US 2014/0169485 A1    Jun. 19, 2014

Related U.S. Application Data

(60) Provisional application No. 61/738,212, filed on Dec. 17, 2012.

(51) Int. Cl.
*H04B 3/54* (2006.01)

(52) U.S. Cl.
CPC .......... *H04B 3/542* (2013.01); *H04B 3/54* (2013.01); *H04B 2203/5495* (2013.01)

(58) Field of Classification Search
CPC ....................................................... H04B 3/542
USPC ........................................................ 375/257
See application file for complete search history.

(56) References Cited

U.S. PATENT DOCUMENTS

| | | | | |
|---|---|---|---|---|
| 8,229,371 B2* | 7/2012 | Kim | ............... | H04B 7/061 455/101 |
| 2009/0168848 A1* | 7/2009 | Constantinidis | ....... | H04B 1/707 375/140 |
| 2009/0168849 A1* | 7/2009 | Rouxel | ............... | H04B 1/707 375/140 |
| 2009/0168939 A1* | 7/2009 | Constantinidis | .... | H04W 52/028 375/359 |
| 2009/0322518 A1* | 12/2009 | Liang | ............... | H04L 45/48 340/539.18 |
| 2010/0061272 A1* | 3/2010 | Veillette | ............... | H04L 45/34 370/254 |
| 2010/0080157 A1* | 4/2010 | Stewart | ............... | H04W 40/12 370/311 |
| 2012/0026941 A1* | 2/2012 | Ahmad et al. | ............... | 370/328 |
| 2012/0147899 A1* | 6/2012 | Du | ............... | H04L 12/413 370/447 |
| 2012/0155349 A1* | 6/2012 | Bajic | ............... | H04W 4/008 370/311 |
| 2013/0094597 A1* | 4/2013 | Vijayasankar | ......... | H04B 3/542 375/257 |
| 2013/0281084 A1* | 10/2013 | Batada | ............... | H04W 88/06 455/426.1 |

OTHER PUBLICATIONS

ITU-T G.9956 , "Narrow-band OFDM power line communication transceivers—Data link layer specification", Nov. 2011.*
"Zigbee / IEEE 802.15.4 Standard" presentation by Stevanovic, Dusan, Jun. 20, 2007.*

(Continued)

*Primary Examiner* — Daniel Washburn
*Assistant Examiner* — Berhanu Tadese
(74) *Attorney, Agent, or Firm* — Tuenlap D. Chan; Frank D. Cimino

(57) ABSTRACT

Apparatus (and related methods) for a power line communication network include a processor configured to receive beacons over a communication interface. The processor determines a link quality indicator (LQI) for each received beacon and ignores the beacons for at most a predetermined maximum number of beacon receptions when each LQI is below a threshold. The processor responds to a received beacon if the LQI for such received beacon exceeds the threshold or if a predetermined maximum number of beacons have been received with LQIs below the threshold.

24 Claims, 8 Drawing Sheets

(56) References Cited

OTHER PUBLICATIONS

ITU-T G.9956, "Narrow-Band OFDM Power Line Communication Transceivers—Data Link Layer Specification", Nov. 2011,—Internet Citation.*

Sinem Coleri Ergen, "Zigbee_IEEE 802.15.4 Summary", Sep. 10, 2004.*

Dusan Stevanovic, Zigbee_IEEE 802.15.4 Standarad, Presentation, Jun. 2007.*

* cited by examiner

ASYMMETRIC CHANNELS IN POWER LINE COMMUNICATIONS

CROSS-REFERENCE TO RELATED APPLICATION

The present application claims priority to U.S. Provisional Patent Application No. 61/738,212, filed on Dec. 17, 2012, which is incorporated herein by reference.

BACKGROUND

There are several different types of communication networks available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the Powerline-Related Intelligent Metering Evolution (PRIME) standard designed for OFDM-based (Orthogonal Frequency-Division Multiplexing) communications. Another PLC standardization effort includes, for example, the IEEE 1901, HomePlug AV, and ITU-T G.hn (e.g., G.9960 and G.9961) specifications.

SUMMARY

The problems noted above are solved in large part by apparatus and related methods for a power line communication network that selectively accept or reject certain message frames based on the quality of the relevant communication links in the network. The rejection of such message frames helps the network to adapt in favor of nodes that may have access to higher quality links. The overhead associated with determining link quality and rejecting a message frame is generally outweighed by the performance benefit in the nodes of the network establishing communication pathways through higher quality links.

In one example, an apparatus for a power line communication network includes a processor configured to receive beacons over a communication interface. The processor determines a link quality indicator (LQI) for each received beacon and ignores the beacons for at most a predetermined maximum number of beacon receptions when each LQI is below a threshold. The processor responds to a received beacon if the LQI for such received beacon exceeds the threshold or if a predetermined maximum number of beacons have been received with LQIs below the threshold.

Another example is directed to a method which includes determining an LQI based on a received registration request from a lower level node and ignoring the registration request if the LQI for the registration request is below the threshold. The method further includes continuing to ignore received registration requests for which the LQI is below the threshold until a maximum predetermined number of registration requests is received. However, in response to receiving a registration request that either has an LQI in excess of the threshold or an LQI that is below the threshold but for which the maximum number of registration requests has been received, the method includes forwarding the registration request to a higher level node.

BRIEF DESCRIPTION OF THE DRAWINGS

For a detailed description of exemplary embodiments of the invention, reference will now be made to the accompanying drawings in which.

DETAILED DESCRIPTION

Figure 1:
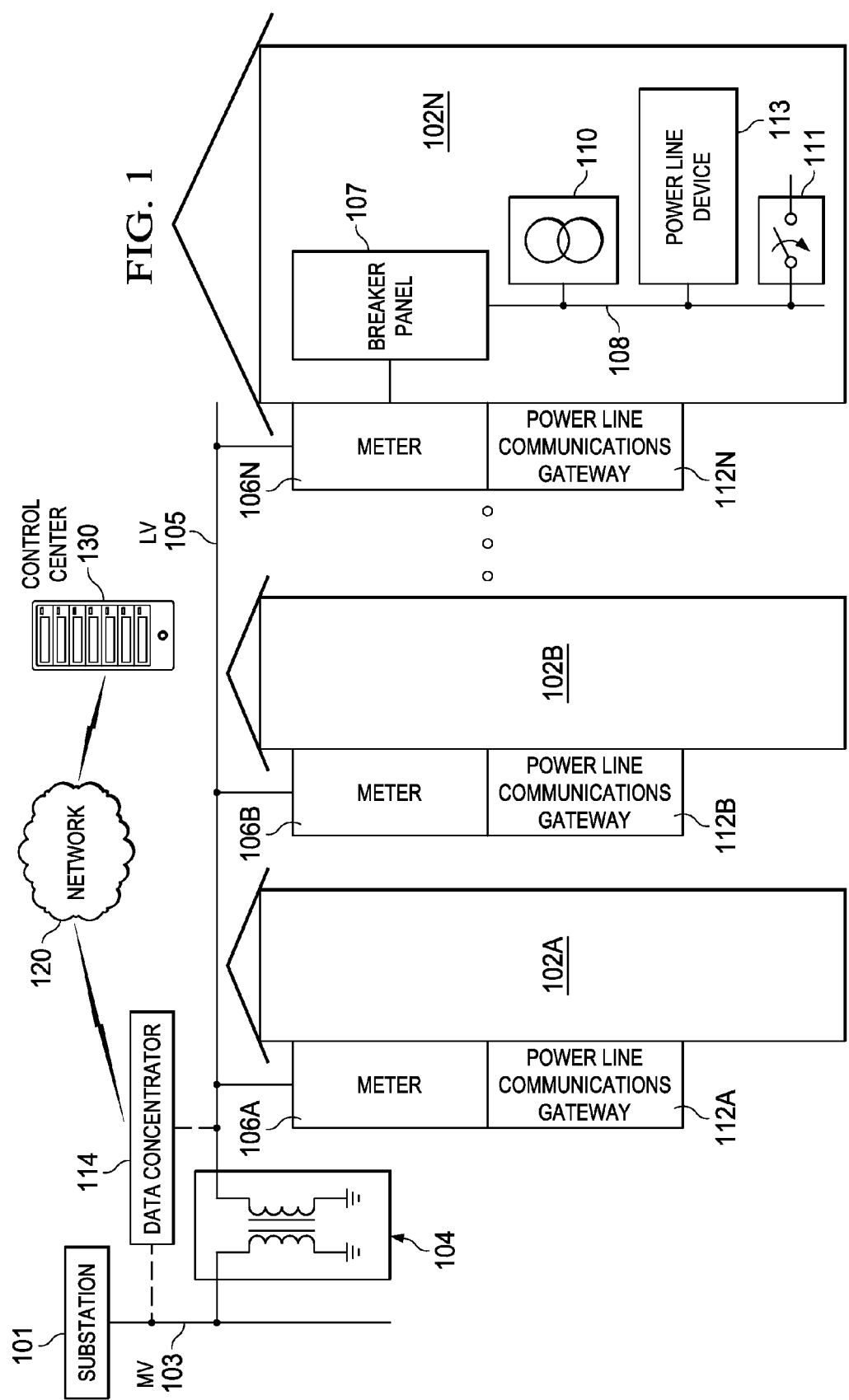
FIG. 1 is a block diagram of a power line communication (PLC) environment according to some embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some power line communication (PLC) networks, such as PRIME networks, a node joins through a switch node or data concentrator and uses that node for communication with a base node. However, in some situations due to channel conditions and/or mismatch in receiver implementations between nodes, the channel in one direction (e.g., downlink direction) may be different than in the other direction (uplink direction). As a result of such channel asymmetry, there may be a loss of frames thereby causing network instability problems.

In various embodiments, the systems and methods described herein may be used to determine communication channel asymmetry in a PLC network. Nodes in the network may ignore various communication frames if link quality indicators (LQIs) associated with the communication links are below various thresholds. The LQIs may differentiate the downlink direction from the uplink direction. That is, between a higher level node and a lower level, one LQI may indicate the quality of the link from higher level node to lower level node, while another LQI may indicate the quality of the link in the opposite direction.

Any of a variety of ways is possible to determine an LQI for a link in a given direction. For example, upon receiving a frame a node may compute the signal-to-noise ratio (SNR) based on the received frame. The node may determine a noise floor on the communication link in the absence of a received frame and determine the signal power upon receipt of a frame. The received frame will include the intended signal itself as well noise. The noise floor may be subtracted from the signal power of the received frame to extract the signal power of the signal itself. Then, the SNR may be calculated by dividing the signal power of the signal itself by the noise floor value. The SNR may be used as the LQI. Between a pair of connected nodes (e.g., a higher level node and a lower level node), the higher level node can calculate the LQI based on a frame transmitted by the lower level node (i.e., in the uplink direction), while the lower level node can calculate the LQI based on a frame transmitted by the higher level node (i.e., in the downlink direction). As such, two different LQIs can be computed on a given link—one LQI for each direction.

Generally speaking, the disclosed systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. However, certain techniques and principles disclosed herein may also be applicable to other communication environments.

Turning now to FIG. 1, an example of an electric power distribution system is shown. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 may operate at low frequencies in the range of 50-60 Hz. Transformer 104 may not allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrow-band control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In some implementations, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
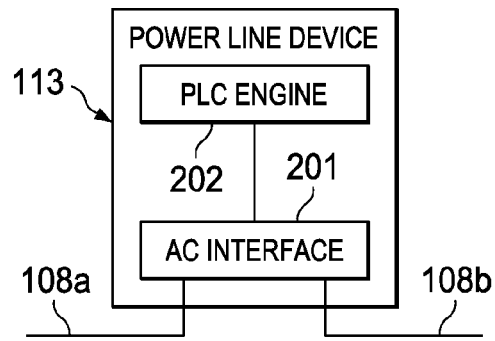
FIG. 2 is a block diagram of a PLC device or modem according to some embodiments.

FIG. 2 is a block diagram of an illustrative PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
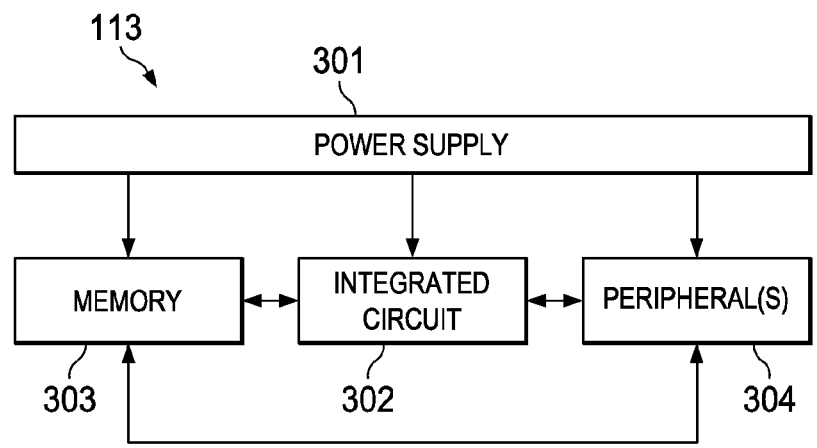
FIG. 3 is a block diagram of an integrated circuit according to some embodiments.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

Figure 4:
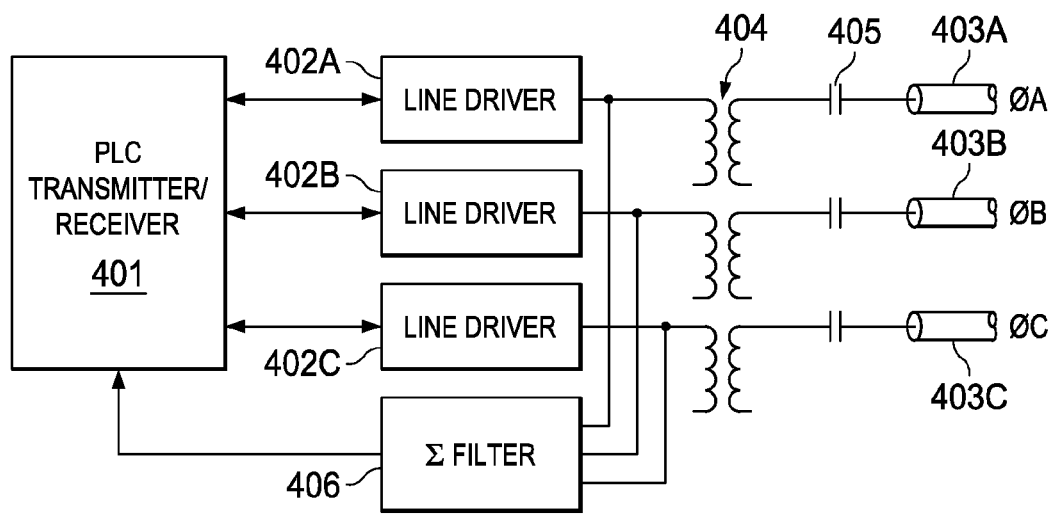
FIG. 4 is a block diagrams illustrating connections between a PLC transmitter and/or receiver circuitry to three-phase power lines according to some embodiments.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

Figure 5:
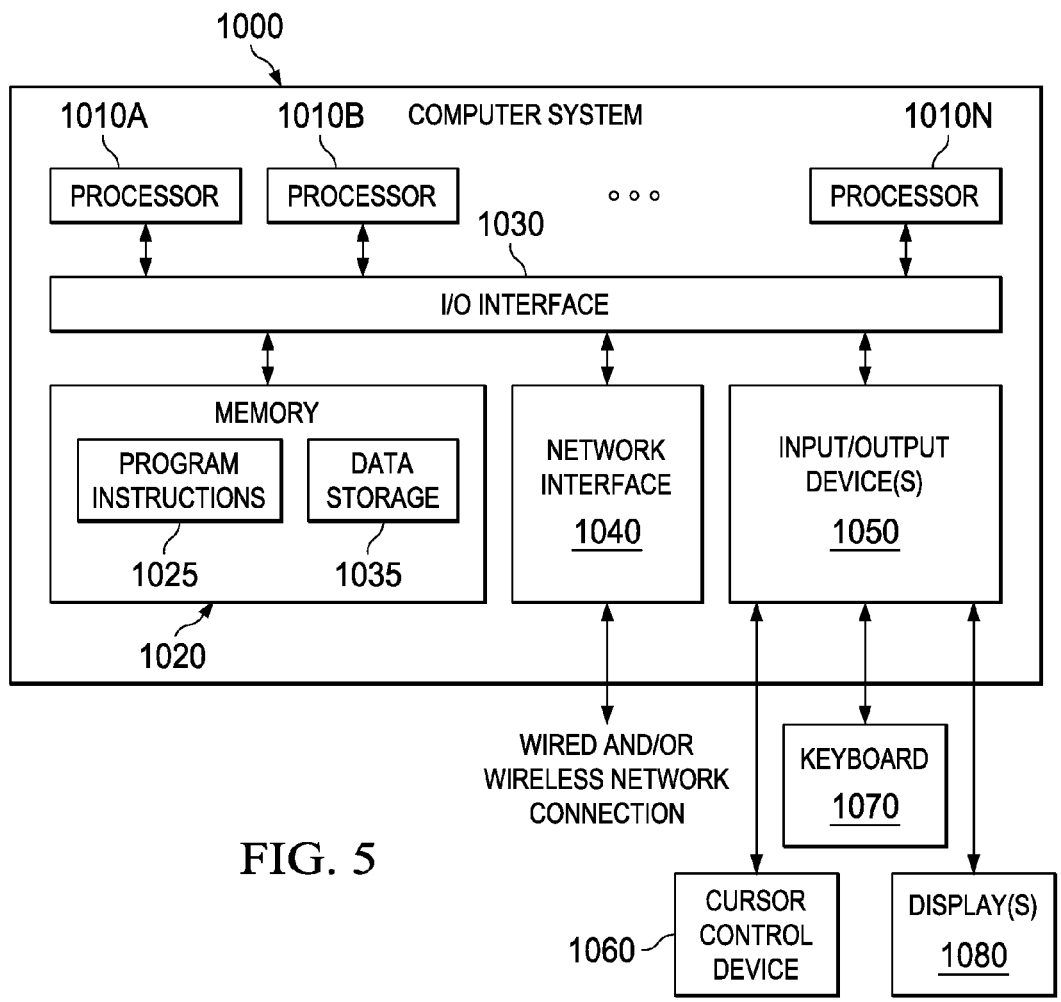
FIG. 5 is a block diagram of a computing system configured to implement certain systems and methods described herein according to some embodiments.

In various embodiments, one or more of the techniques described herein may be executed, at least in part, by one or more communication devices and/or computer systems. One such computer system is illustrated in FIG. 5. In various embodiments, system 1000 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1000 includes one or more processors 1010 coupled to a system memory 1020 via an input/output (I/O) interface 1030. Computer system 1000 further includes a network interface 1040 (coupled to I/O interface 1030, and one or more input/output devices, such as cursor control device 1060 (e.g., mouse, trackpad, etc.), keyboard 1070, and/or display(s) 1080.

System memory 1020 may be configured to store program instructions and/or data accessible by processor 1010. In various embodiments, system memory 1020 may be implemented using any suitable type of non-transitory storage device, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. The various operations described herein as attributed to a node of the PLC network may be implemented by the processors 1010 executing the program instructions. Generally speaking, a non-transitory, computer-accessible medium may include any tangible storage media or memory media such as magnetic or optical media—e.g., disk or CD/DVD-ROM coupled to computer system 1000 via I/O interface 1030. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1040.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. The network interface is a communications interface and may implement at least some of the power line interface circuitry shown in FIGS. 2-4.

Figure 6:
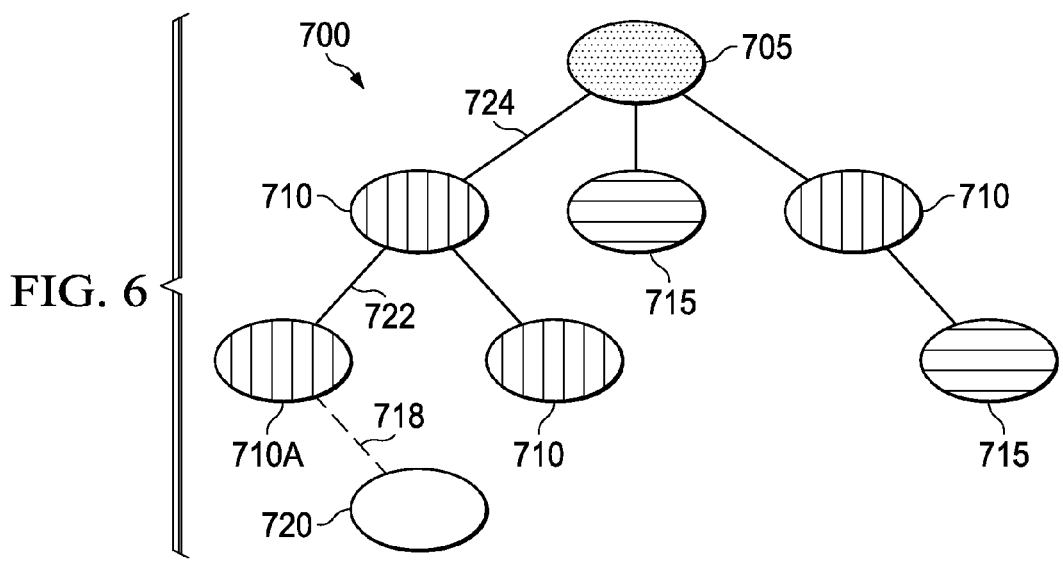
FIG. 6 is a block diagram of nodes in a PLC network following the PRIME standard according to some embodiments.

FIG. 6 is a schematic diagram of nodes in an illustrative PLC network 700 following the PRIME standard according to some embodiments. The PRIME standard permits various subnetworks of nodes to exist and communicate with one another. FIG. 6 illustrates one such subnetwork as PLC network 700 includes a base node 705 which may be a PLC data concentrator or the like, and which is shown, for example, as element 114 in FIG. 1. The base node is at the root of the network tree and functions as a master node that provides connectivity to the subnetwork. The base node manages the subnetwork resources and connections. All other nodes in the network (i.e., nodes 710, 715, 720) are referred to as "service" nodes. A service node may communicate directly with the base node 705 or may communicate with the base node 705 via other service nodes. A service node may not be able to communicate directly with the base node due to the distance between the service and base nodes, intervening transformers, etc. Each of the nodes 705, 710, 715, and 720 in FIG. 6 may be implemented with the embodiments shown in FIGS. 1-5.

Service nodes 710 and 715 have already been registered with network 700. A node must be registered with the network before being capable of sending and receiving frames. Once registered with the network, a service node may request promotion to function as a switch node to permit lower level nodes to communicate through them to the base node. Service nodes 710 (vertical cross-hatching) have been promoted to function as switch nodes (thus, service nodes 710 are also referred to as "switch" nodes), while service nodes 715 (horizontal cross-hatching) have not been promoted to function as switch nodes. Service node 720 (no cross-hatching) is shown in FIG. 6 not coupled to any other node to indicate that node 720 has not already been registered with the network. Also, as used herein, the terms "lower level" and "higher level" refer to the placement of nodes in the network diagram of FIG. 6. For example, the base node 705 is at a higher level than the service nodes 710-720. Switch nodes 710 are higher level nodes than service nodes that use such switch nodes as a communication pathway to the base node 705.

A function performed by the base node 705 is to grant promotion requests received from service nodes desiring to be promoted to switch node status. Once promoted to a switch node, the switch node may transmit periodic beacon messages (referred to herein as "beacons") in a downward direction (i.e., toward lower level nodes in network 700). A node not already registered with the network 700 (e.g., node 720) may receive one or more beacons from higher level switch nodes, and may select a particular switch node as its "parent" so that it may register with or join network 700 thorough the selected parent. The various connections between nodes in FIG. 6 reflect the parent-child relationship between nodes that results from the registration process.

Also, in order to determine which devices are present in network 700, base node 705 may transmit "alive request" frames, across network 700, and base node 705 may receive "alive response" frames from registered nodes (e.g., nodes 710 and 715) that are reached by the alive requests. The alive responses indicate to the base node 705 which registered nodes are still able to participate in the network and send and receive frames. A registered node that does not respond to an alive request frame with an alive response frame may turned off or otherwise non-functional.

In various embodiments, different techniques may be used by new node 720 in the process of choosing one of switch nodes 710 and 715 to attempt to register itself onto network 700 based upon received beacons. These techniques may be implemented, for example, through modifications to the Media Access Control (MAC) protocol. Generally speaking, a MAC protocol is a sub-layer of a data link layer specified in a seven-layer Open Systems Interconnection (OSI) model. Particularly, a MAC protocol may provide addressing and channel access control mechanisms that enable network nodes (e.g., PLC modems, etc.) to communicate over a shared medium (i.e., a power line). To facilitate communications among the devices described above, each of nodes 705-720 may implement a MAC protocol configured to coordinate inter-device communications.

A service node that is not registered with the network (e.g., new node 720) may become registered after receiving and responding to a beacon from a higher level switch or base node. If beacons from multiple higher level nodes are received by the new node 720, the new node may choose which higher level node to be its parent. A currently unregistered node may respond to a particular beacon by transmitting a Registration Request (REG_REQ) frame. The REG_REQ frame indicates the node's desire to be registered with the PLC network. The REG_REQ frame is forwarded up the network to the base node 705 which grants the registration request and maintains a list of all nodes registered with the network. The base node responds with a Registration Granted frame which is returned to the service node that originated the REG_REQ frame and the service node is thereby registered with the network and can begin to send and receive data frames on the network.

A new node may want to register with a PLC network but has not yet received a beacon. This situation might happen if the new node is too far from the base node 705 to receive beacons from the base node and no other higher level node close to the new node have been promoted to switch node status. In such a case, the new node may transmit a Promotion Needed Protocol Data Unit (PNPDU) frame. This frame requests a higher level service node receiving the frame to take action to promote itself to a switch node. Upon receipt of the PNPDU frame at a service node, that node transmits a Promotion Request frame (PRO_REQ_S) to that node's higher level parent node which may be another switch node or the base node 705. Upon receipt of the PRO_REQ_S frame at a parent switch node, the parent node in turn forwards the PRO_REQ_S frame to its parent node, and eventually the PRO_REQ_S frame is receive by the base node 705. The base node may grant the promotion request by returning a PRO_REQ_B frame back to the service node that originated the Promotion Request. Upon receipt of the return PRO_REQ_B frame, the service node thereby is promoted to a switch node. One of the functions of a switch node is to periodically transmit beacon frames to permit other service nodes a chance to join the network.

The quality of a given communication link between a pair of connected nodes may be in a range from less than desirable to excellent. Further, the quality of the link in the downlink direction may differ from the quality of the link in the uplink direction. Link quality may be affected by noise on the power lines, intervening transformers, etc. In accordance with the preferred embodiments, the various service nodes 710-720 and the base node 705 may ignore various of the standard PRIME frames noted above upon determining that an inadequate link quality exists. Various such scenarios are illustrated in FIGS. 7-12 and discussed below. Each service node may perform any or all of the methods described below.

Figure 7:
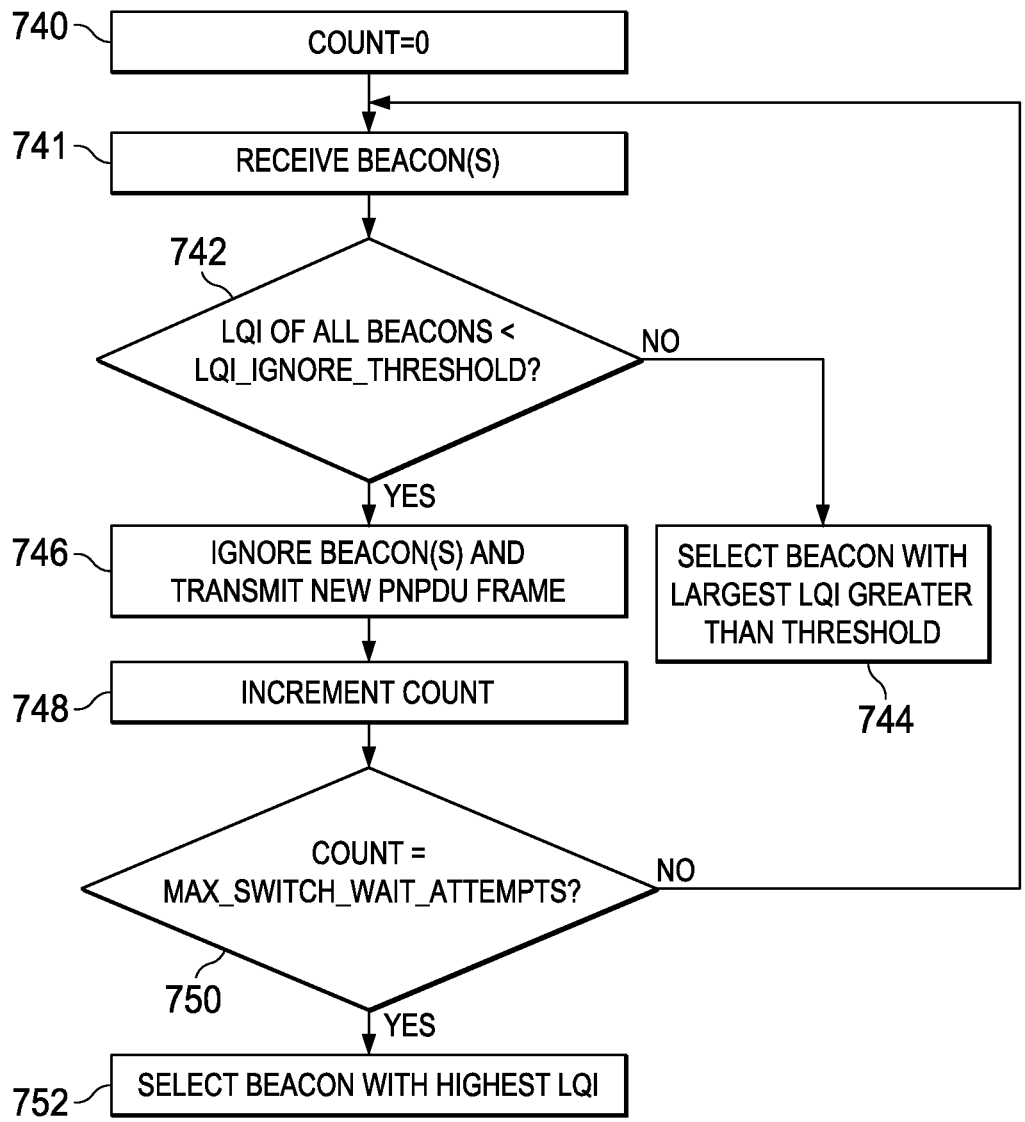
FIG. 7 is a flow chart illustrating a service node ignoring a beacon with a link quality index below a threshold according to some embodiments.

FIG. 7 illustrates an embodiment in which an unregistered node (e.g., new node 720 in FIG. 6) receives a beacon. As explained above, an unregistered node receiving a beacon (or upon selecting a particular higher level switch node from among multiple switch nodes that have transmitted beacons) would normally respond to the beacon with a REG_REQ frame. In the embodiment, of FIG. 7, however, the unregistered node may choose to ignore all beacons if the quality of the link associated with all such beacons is below a threshold. By the node ignoring beacons over links with unacceptable link quality, the node affords an opportunity to other higher level switch nodes to send beacons over links with acceptable link quality.

At 740, the unregistered node sets a COUNT value to 0. At 742, the node receives a beacon(s). The node computes the LQI based on the received beacon(s) and at 7421 compares the LQI to a threshold (LQI_IGNORE_THRESHOLD). At 744, if the LQI(s) associated with the various beacons are not all below the LQI_IGNORE_THRESHOLD, then the node selects the beacon and thus the corresponding switch node with the largest LQI above the threshold as its parent node.

However, if all LQI(s) are below the LQI_IGNORE_THRESHOLD, then at 746, the node ignores the beacon(s) and transmits a PNPDU frame. As explained above, the PNPDU frame requests a higher level service node to have itself promoted to a switch node. In this way, the unregistered node attempts to have the network promote a different service node to a switch node with the hope that such a switch node will have a higher quality link to the unregistered node. It is possible, however, that no other service node exists that would have a higher quality LQI to the unregistered node. Thus, the method of FIG. 7 entails the unregistered node attempting to find a higher quality link to a switch node for only a predetermined number of times. The COUNT value is incremented at 748. If the COUNT value remains below a terminal value (e.g., MAX_SWITCH_WAIT_ATTEMPTS) at 750, then control loops back to 742 at which a new round of beacon(s) is received. However, if the COUNT value has reached the MAX_SWITCH_WAIT_ATTEMPTS terminal value, then unregistered node gives up attempting to find a parent switch node with a higher LQI and selects from among the currently received beacons, the beacon with the highest LQI. The switch node that transmitted that particular beacon becomes the parent to the unregistered node and the node then transmits a REG_REQ frame as described previously.

Figure 8:
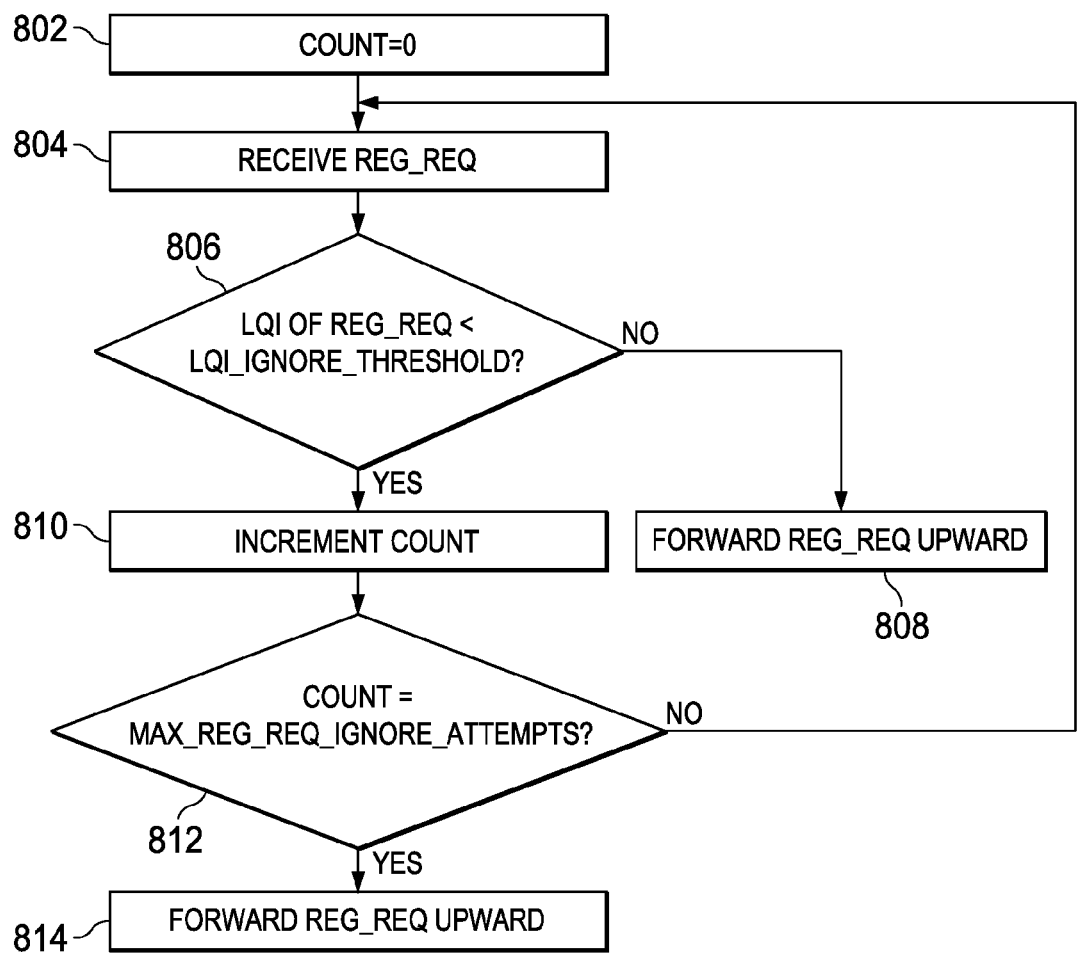
FIG. 8 is a flow chart illustrating a service node ignoring a registration request from a lower level node based on a link quality index being below a threshold according to some embodiments.

FIG. 8 shows a method by which a switch node (e.g., nodes 710) responds to a REG_REQ frame received from a lower level service node attempting to register with the network. Ordinarily, the switch node would forward the REG_REQ frame to its parent (another switch node or the base node 705). However, doing so may result in a service node joining a network even with inadequate quality of the link in the direction from the service node attempting to join the network to the switch node receiving the REG_REQ frame.

In FIG. 8, a COUNT value is set to 0 at 802. This COUNT variable may be the same or different than the COUNT value shown in FIG. 7 and described above. At 804, the service node receives a REG_REQ frame from a service node attempting to join the network. If the LQI (as computed based on the received REG_REQ frame) associated with the received REG_REQ frame (uplink direction) is greater than a threshold (LQI_IGNORE_THRESHOLD) as determined at 806, then at 808 the LQI in the uplink direction is deemed adequate and the REG_REQ frame is forwarded on up towards the base node 705.

If, however, the LQI is less than threshold, then the counter value (COUNT) is incremented at 810. As determined at 812, if the COUNT value has not reached a predetermined terminal count value (MAX_REG_REQ_IGNORE_ATTEMPTS), then the switch node ignores the REG_REQ frame and control loops back to 804 to await receipt of another REG_REQ frame. The switch frame continues to receive REG_REQ frames from a particular service node attempting to join the network and, if the LQI is below the threshold, ignore such REG_REQ frames for a certain number of times (MAX_REG_REQ_IGNORE_ATTEMPTS). Once the COUNT value reaches the terminal value defined by MAX_REG_REQ_IGNORE_ATTEMPTS, then the switch node no longer ignores the REG_REQ frames from the node attempting to join the network and forwards the REG_REQ frame upward at 814 toward the base node 705. The concept behind the embodiment of FIG. 8 is that the switch node will force the service node attempting to join the network to repeatedly send REG_REQ frames with the hope that another service node will receive the REG_REQ frames over a link with a higher quality (and a link quality that exceeds the LQI_IGNORE_THRESHOLD). Thus, the switch node detecting an inadequate link quality effectively gives other switch nodes with better link quality a chance to become the unregistered node's parent.

Figure 9:
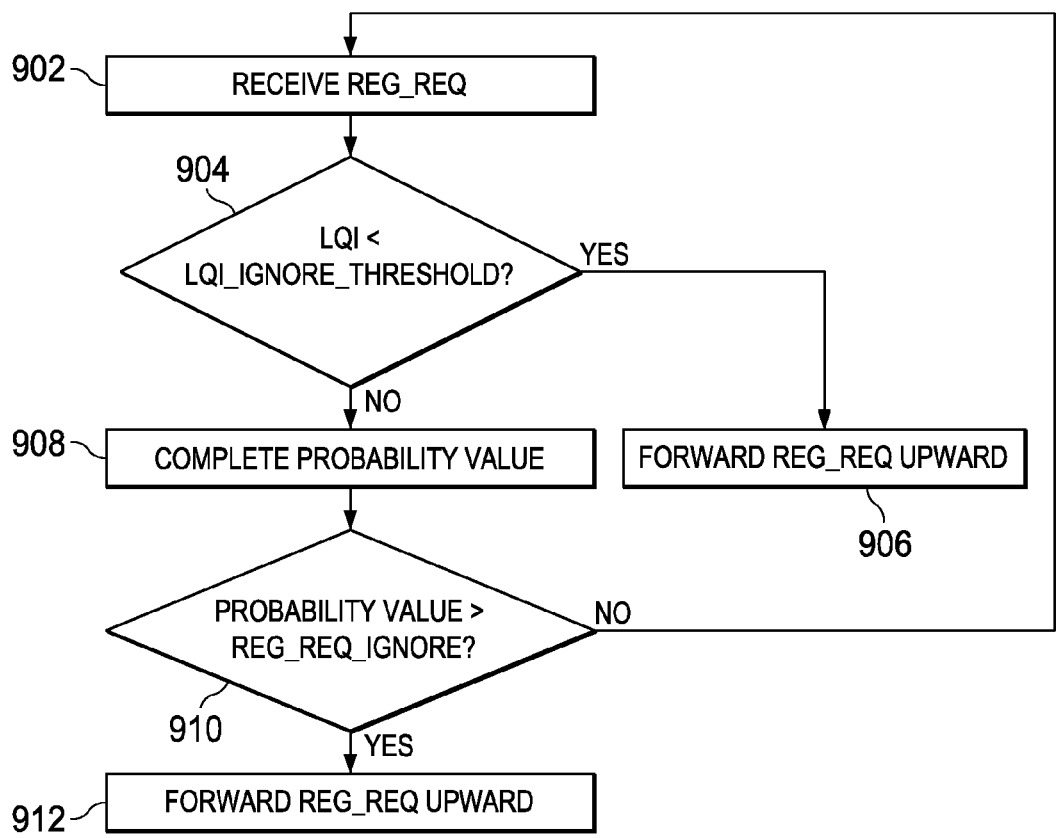
FIG. 9 is a flow chart illustrating a service node ignoring a registration request from a lower level node based on a link quality index being below a threshold according to another embodiment.

FIG. 9 is an alternative embodiment to that of FIG. 8 for a switch node to ignore a REG_REQ based on inadequate uplink quality. In FIG. 8 the decision by the switch node as to whether to selectively ignore or forward the REG_REQ frame is based on a probability value. The concept behind the embodiment of FIG. 8 is that for a switch node that detects an inadequate link quality (i.e., an LQI less than LQI_IGNORE_THRESHOLD), there is a probability as to whether another switch node may or may not be able to be a parent to the node attempting to register. Thus, rather than forcing the switch node as in FIG. 8 to repeatedly receive and ignore REG_REQ frames from a service node attempting to join the network for a predetermined number of tries, the switch node makes a decision whether to ignore or forward the REG_REQ based on a probability value.

At 902 in FIG. 9, the switch node receives a REG_REQ frame from a service node attempting to join the network. At 904, the switch node compares the LQI to the LQI_IGNORE_THRESHOLD. If the LQI is above the threshold, the switch node forwards the REG_REQ fame upward at 906 toward the base node.

However, if the LQI is below the threshold, then at 908, the service node computes a probability value. In some implementations, the probability value may be computed as a random number within a given range. At 910, the probability value is compared to a Registration Request Ignore (REG_REQ_IGNORE) threshold. In one example, the probability value is an integer determined at random in the range of 1 to 10. The REG_REQ_IGNORE value may be set at 5. If the probability value is greater than the REG_REQ_IGNORE value then the REQ_REQ frame is forwarded upward toward the base frame despite the LQI being deemed inadequate. If the probability value is less than the REG_REQ_IGNORE value, then the REQ_REQ frame is ignored and the REG_REQ frame is not forwarded towards the base node and control loops back to 902 at which time another REG_REQ frame is received.

With the embodiment of FIG. 9, sometimes a REG_REQ frame is ignored and sometimes the frame is forwarded upward towards the base node even with LQI being determined to be less than the LQI_IGNORE_THRESHOLD. The embodiment of FIG. 8, however, also has the result in that if a certain number of REG_REQ frames are received over an inadequate link, the frame will eventually be forwarded upward toward the base node anyway. The REG_REQ_IGNORE value may be set to a level to achieve a similar result.

As explained above, a service node that has not yet registered with a network may not be able to receive any beacons. The base node 705 transmits beacons, but an unregistered service node (e.g., node 720 in FIG. 6) may be located too far from the base node to receive the beacons. Further, all nodes within effective communication range of the unregistered service node may not have yet requested promotion to service node status and thus are unable to transmit beacons. Thus, the unregistered service is essentially stuck unable to join the network.

The unregistered service node, however, can transmit a PNPDU frame to request any service node that receives the frame to initiate the process of being promoted to switch node status. Once promotion is completed of a service node to a switch node, the switch node begins to send beacons, which thereby provides the unregistered service node a way to join the network.

A service node that receives a PNPDU frame from an unregistered service node ordinarily would generate and transmit upwards towards the base node 705 a PRO_REQ_S frame. However, doing so may result in a service node becoming a switch node even with less than desirable link quality. The method of FIG. 10 addresses this issue by having any node that receives a PRO_REQ_S frame (which is originated by a service node attempting to have itself promoted to a switch node) to forward or ignore the received PRO_REQ_S frame based on the LQI computed based on the received PRO_REQ_S frame.

At 1002, a COUNT value is set to 0. At 1004, the node receives a PRO_REQ_S frame from a lower level node. The node computes an LQI based on the received PRO_REQ_S frame as described above and compares the LQI at 1006 to a PRO_REQ_THRESHOLD. The PRO_REQ_THRESHOLD may be greater than the LQI_IGNORE_THRESHOLD described above. If the LQI is greater than the PRO_REQ_THRESHOLD, the node forwards the PRO_REQ_S frame upward toward the base node 705 (operation 1008).

If, however, the LQI is less than the PRO_REQ_THRESHOLD, the COUNT value is incremented at 1010. If the COUNT value has not yet reached a predetermined maximum threshold value (decision 1012), then the node ignores the PRO_REQ_S frame and control loops back to 1004 at which the node awaits another PRO_REQ_S frame. By ignoring the PRO_REQ_S frame, the network gives other nodes with hopefully better link quality a chance to be promoted to a switch node. The node continues to ignore the PRO_REQ_S frames until the COUNT value reaches the maximum threshold value. Once that happens, the node forwards the PRO_REQ_S frame upward toward the base node (1014). Or if the node performing the method of FIG. 10 is the base node 705 itself, the base node responds to the promotion request (e.g., by a frame that grants the promotion request, a PRO_REQ_B frame).

Figure 10:
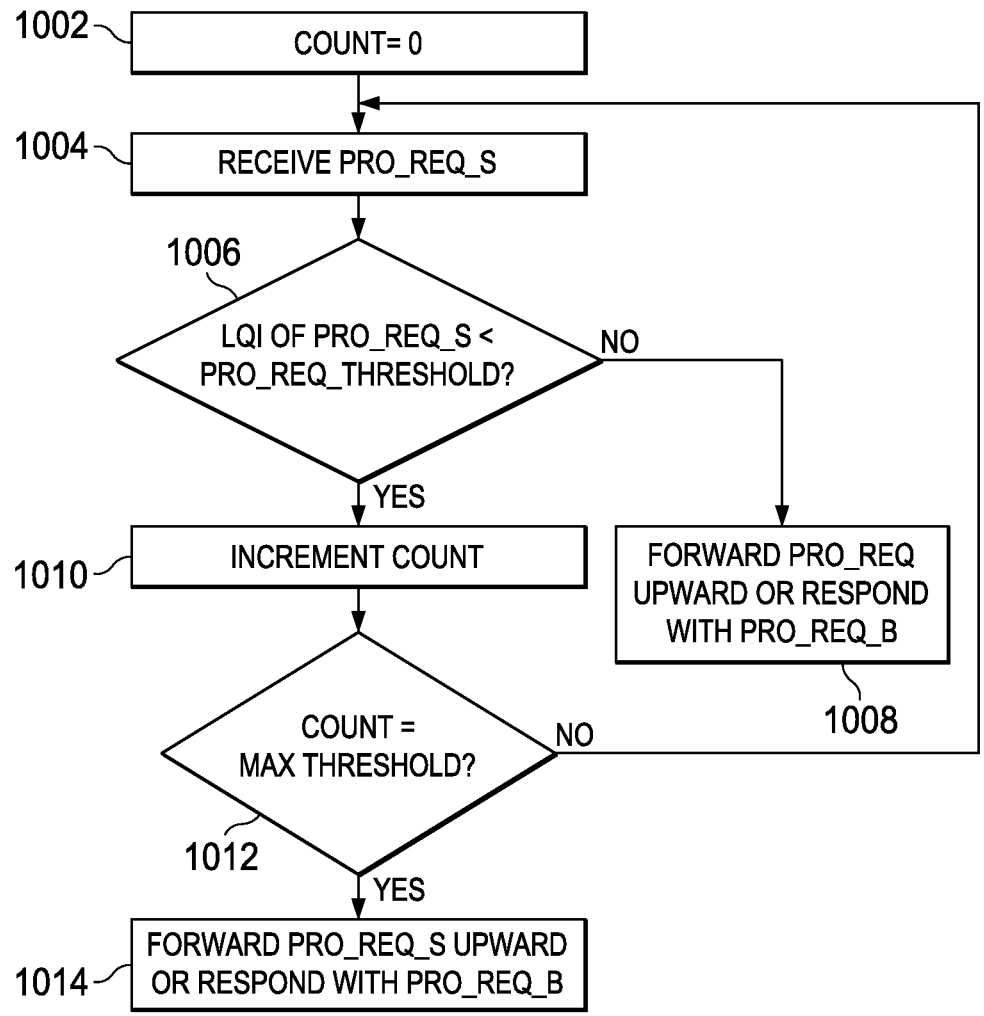
FIG. 10 is a flow chart illustrating a service node ignoring a promotion request from a lower level node based on a link quality index being below a threshold according to some embodiments.
Figure 11:
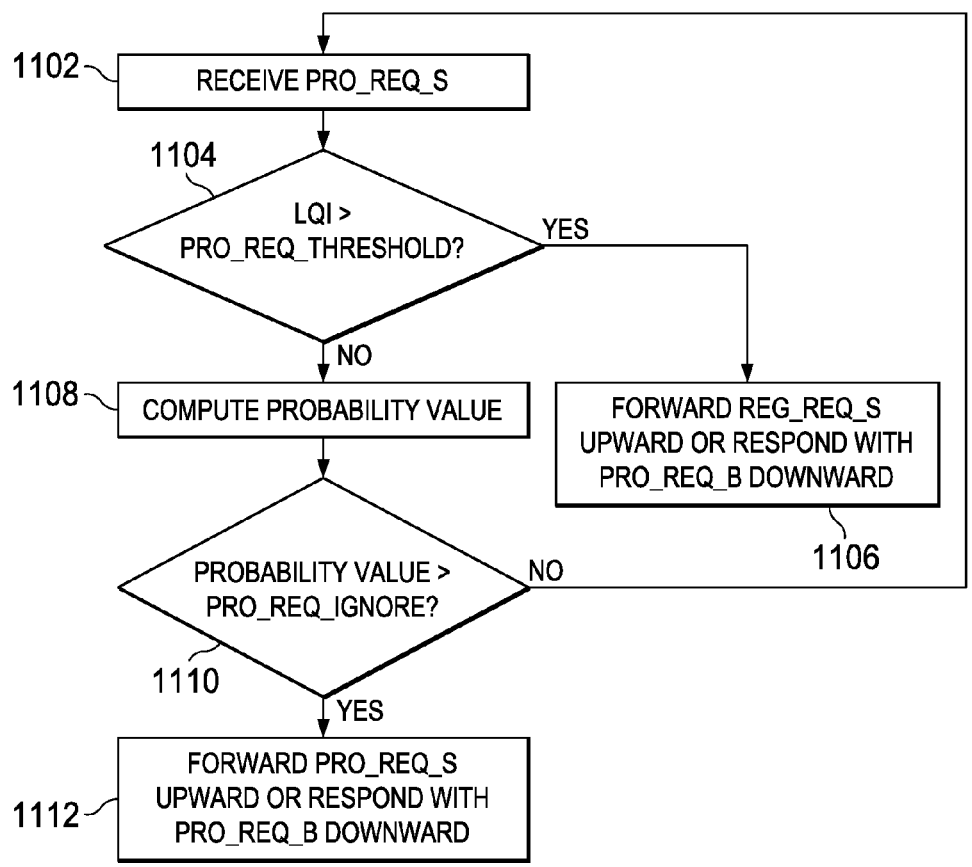
FIG. 11 is a flow chart illustrating a service node ignoring a promotion request from a lower level node based on a link quality index being below a threshold according to another embodiment.

FIG. 11 provides an alternative method to that of FIG. 10, but like FIG. 9, is based on a probability value. At 1102 in FIG. 11, the switch node receives a PRO_REQ_S frame from a service node attempting to be promoted to switch node. At 1104, the receiving switch node compares the LQI computed based on the received PRO_REQ_S frame to the PRO_REQ_THRESHOLD. If the LQI is above the threshold, the switch node forwards the PRO_REQ_S fame upward at 1106 toward the base node or, if the node is the base node, responds with a PRO_REQ_B frame if granting the promotion request.

However, if the LQI is below the threshold, then at 1108, the service node computes a probability value. In some implementations as noted above, the probability value may be computed as a random number within a given range. At 1110, the probability value is compared to a Promotion Request Ignore (PRO_REQ_IGNORE) threshold. In one example, the probability value is an integer determined at random in the range of 1 to 10. The PRO_REQ_IGNORE value may be set at 5. If the probability value is greater than the PRO_REQ_IGNORE value then the PRO_REQ_S frame is forwarded upward toward the base frame despite the LQI being deemed inadequate (or, if a base, a PRO_REQ_B frame is returned to grant the promotion request). If the probability value is less than the PRO_REQ_IGNORE value, then the PRO_REQ_S frame is ignored and the PRO_ REQ_S frame is not forwarded towards the base node and control loops back to 1102 at which time another PRO_REQ_S frame is received.

Figure 12:
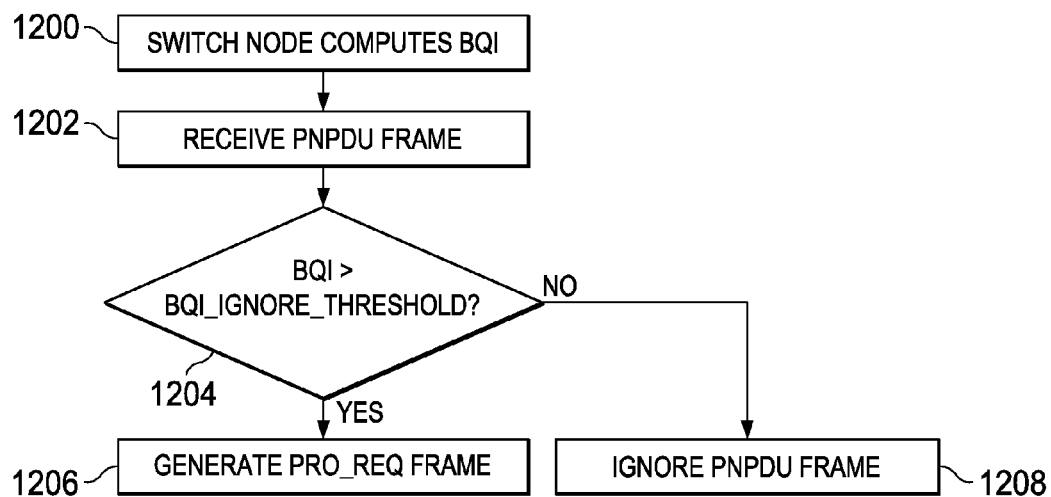
FIG. 12 is a flow chart illustrating a service node receiving yet ignoring a promotion needed protocol data unit based on a quality index of higher level links being below a threshold according to some embodiments.

For the embodiments of FIGS. 10 and 11, a node receiving a PRO_REQ_S may choose to ignore the promotion request frame rather than forwarding up the network toward the base node 705 (or, if the base node, responding with PRO_REQ_B frame to grant the request). In the embodiment of FIG. 12, a node receiving a PNPDU frame, which requests the node to initiate the promotion process, may ignore the PNPDU frame and generate a PRO_REQ_S frame based on the quality of the link between the node potentially generating the PRO_REQ_S frame and the base node. That is, the quality of the link between the node desiring to be promoted and the lower level node generating the PNPDU frame attempting to join the network may be sufficient, but the quality of the higher level links above the node desiring to be promoted may be less than desirable. Referring briefly to the example of FIG. 6, node 720 may have previously attempted to join the network through the lower left node 710A (before it was promoted to a switch node) as indicated by the dashed line 718. The quality of the link along dashed line 718 may be more than adequate, but the quality of link 722 and/or 724 may be less than desirable. Based on the less than desirable quality of links 722, 724, the node 710A may opt to ignore a PNPDU frame from node 720 even though link 718 has more than adequate link quality.

The quality of such higher level links can be determined in a variety of ways. For example, the quality of the higher level links may be measured in terms of the probability of success for a frame to traverse the end-to-end route between base node 705 and a given switch node. The PRIME standard permits the base node 705 to send out alive frames. Each alive frame has a counter value that is incremented for each successive alive frame sent to a particular switch node. Alive response frames sent back to the base node also have a counter value. An example of a metric for the higher level links (i.e., higher level from the node considering whether to generate a PRO_REQ frame) is based on "alive frames" and may be computed as follows:

$$\text{Probability of Success} = \left(\frac{BNA1vRxCnt}{SNA1vTxCnt}\right) * \left(\frac{SNA1vRxCnt}{BNA1vTxCnt}\right)$$

where BNA1vRxCnt is the number of alive responses received by the base node, SNA1vTxCnt is the number of alive responses transmitted by a given switch node, SNA1vRxCnt is the number of alive requests received by the given switch node, and BNA1vTxCnt is the number of a live requests transmitted by the root node. These may each be determined by the switch node, for example, by monitoring the transmit counter ("TXCNT") and receive counter ("RX-CNT") fields in the alive messages, and cumulatively tracking the counter(s) to obtain the total number of alive messages sent and received by the base node. For example, if the switch node receives an alive request with a counter set to 5, followed by another alive request with a counter set to 8, the switch may infer that alive requests 6 and 7 were not received).

Alternatively, the probability of success may be calculated for the uplink direction only (i.e., from the switch node to the base node) as follows:

$$\text{Probability of Success} = \left(\frac{BNA1vRxCnt}{SNA1vTxCnt}\right)$$

The PRIME standard specifies the use of a beacon quality (BCN.QLTY) field. This field represents the round trip quality of a switch node—that is, the quality of the path from the base node 705 to a particular switch node. In some cases, a given switch node may keep track of alive counters from the instant the switch node is initially registered to the network. Then, the resulting probability values may be mapped to the BCN.QLTY field as a Beacon Quality Index (BQI) or the like. An example to help illustrate this mapping procedure is provided in Table I below:

TABLE I

| Probability Range | BQI |
| --- | --- |
| 0.9-1 | 7 |
| 0.75-0.9 | 6 |
| 0.5-0.75 | 5 |
| 0.25-0.5 | 4 |
| 0.15-0.25 | 3 |
| 0.1-0.15 | 2 |
| 0.05-0.1 | 1 |
| 0-0.05 | 0 |

Other suitable mappings may be used as well resulting in more or fewer than 8 indices and/or different probability ranges.

FIG. 12 shows an example of a method for a switch node to generate or ignore a PNPDU frame from a node attempting to join the network. The decision to generate or ignore the PNPDU frame is based on the quality of the upper level links. At 1200, a switch node (and preferably every switch node registered in the network) computes a BQI. An example of how to compute a BQI is explained above. The BQI may be a mapping to an integer index value from a computed probability value which itself may be based on the "probability of success" equations above. At 1202, a switch node receives a PNPDU frame from a node attempting to join the network. At 1204, the switch node compares the computed BQI to a BQI_IGNORE_THRESHOLD value and ignores (1208) the PNPDU frame if the BQI is less than the threshold or generates (1206) a PRO_REQ frame if the BQI exceeds the threshold. If desired, a counter may be added to the logic of FIG. 12 so that PNPDU frames received by a switch node with a BQI below the threshold are continued to be ignored for a predetermined number of times, after which the switch node generates the PRO_REQ frame anyway.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for a power line communication network, comprising:
   a processor configured to receive beacons over a communication interface, determine a link quality indicator (LQI) for each received beacon, and ignore the beacons for at most a predetermined maximum number of beacon receptions when each LQI is below a threshold;
   wherein the processor responds to a received beacon if the LQI for such received beacon exceeds the threshold or if a predetermined maximum number of beacons have been received with LQIs below the threshold.

2. The apparatus of claim 1 wherein the processor increments a counter each time a beacon is received whose LQI is below the threshold.

3. The apparatus of claim 2 wherein the processor responds to the received beacon when the beacon is received whose LQI is below the threshold and the counter has reached a maximum count value.

4. The apparatus of claim 1 wherein the processor determines the LQI based on a received registration request from a lower level node and ignores the registration request if the LQI for the registration request is below the threshold.

5. The apparatus of claim 4 wherein the processor continues to ignore received registration requests for which the LQI is below the threshold until a maximum predetermined number of registration requests are received.

6. The apparatus of claim 5 wherein, in response to receiving a registration request that either has an LQI in excess of the threshold or an LQI that is below the threshold but for which the maximum number of registration requests has been received, the processor forwards the registration request to a higher level node.

7. The apparatus of claim 1 wherein the processor determines an LQI based on a received registration request from a lower level node and determines whether to selectively ignore the registration request or to forward the registration request to a higher level node based on a probability value.

8. The apparatus of claim 1 wherein the processor determines an LQI based on a received registration request from a lower level node and determines whether to selectively ignore the registration request or to forward the registration request to a higher level node based on a comparison of a probability value to a registration request ignore threshold.

9. The apparatus of claim 1 wherein the processor determines an LQI based on a received promotion request from a lower level node and ignores the promotion request if the LQI for the promotion request is below the threshold.

10. The apparatus of claim 9 wherein the processor continues to ignore received promotion requests for which the LQI is below the threshold until a maximum predetermined number of promotion requests is received.

11. The apparatus of claim 10 wherein, in response to receiving a promotion request that either has an LQI in excess of the threshold or an LQI that is below the threshold but for which the maximum number of promotion requests has been received, the processor forwards the promotion request to a higher level node.

12. The apparatus of claim 1 wherein the processor determines an LQI based on a received promotion request from a lower level node and determines whether to selectively ignore the promotion request or to forward the promotion request to a higher level node based on a probability value.

13. The apparatus of claim 1 wherein the processor determines an LQI based on a received promotion request from a lower level node and determines whether to selectively ignore the promotion request or to forward the promotion request to a higher level node based on a comparison of a probability value to a promotion request ignore threshold.

14. The apparatus of claim 1 wherein the processor ignores a Promotion Needed Protocol Data Unit (PNPDU) frame for the node to be promoted to a service node based on a quality of a link to or from a base node being less than a threshold.

15. A method, comprising:
receiving beacons;
determining a link quality indicator (LQI) for each received beacon;
ignoring the beacons for at most a predetermined maximum number of beacon receptions when each LQI is below a threshold; and
responding to a received beacon if the LQI for such received beacon exceeds the threshold or if a predetermined maximum number of beacons have been received with LQIs below the threshold.

16. The method of claim 15 further comprising incrementing a counter each time a beacon is received whose LQI is below the threshold and responding to a received beacon when a beacon is received whose LQI is below the threshold and the counter has reached a maximum count value.

17. The method of claim 15 further comprising:
determining an LQI based on a received registration request from a lower level node;
ignoring the registration request if the LQI for the registration request is below the threshold;
continuing to ignore received registration requests for which the LQI is below the threshold until a maximum predetermined number of registration requests is received; and
in response to receiving a registration request that either has an LQI in excess of the threshold or an LQI that is below the threshold but for which the maximum number of registration requests has been received, forwarding the registration request to a higher level node.

18. The method of claim 15 further comprising determining an LQI based on a received registration request from a lower level node and determining whether to selectively ignore the registration request or to forward the registration request to a higher level node based on a probability value.

19. The method of claim 15 further comprising determining an LQI based on a received registration request from a lower level node and determining whether to selectively ignore the registration request or to forward the registration request to a higher level node based on a comparison of a probability value to a registration request ignore threshold.

20. The method of claim 15 further comprising determining an LQI based on a received promotion request from a lower level node and ignoring the promotion request if the LQI for the promotion request is below the threshold.

21. The method of claim 20 further comprising continuing to ignore received promotion requests for which the LQI is below the threshold until a maximum predetermined number of promotion requests is received, and wherein, in response to receiving a promotion request that either has an LQI in excess of the threshold or an LQI that is below the threshold but for which the maximum number of promotion requests has been received, forwarding the promotion request to a higher level node.

22. The method of claim 15 further comprising determining an LQI based on a received promotion request from a lower level node and determining whether to selectively ignore the promotion request or to forward the promotion request to a higher level node based on a probability value.

23. The method of claim 15 further comprising determining an LQI based on a received promotion request from a lower level node and determining whether to selectively ignore the promotion request or to forward the promotion request to a higher level node based on a comparison of a probability value to a promotion request ignore threshold.

24. The method of claim 15 further comprising ignoring a Promotion Needed Protocol Data Unit (PNPDU) frame for the node to be promoted to a service node based on a quality of a link to or from a base node being less than a threshold.

* * * * *